July 28, 1925.
A. H. MITTAG
MEANS FOR REPRODUCING POSITION
Filed July 20, 1923
1,547,435
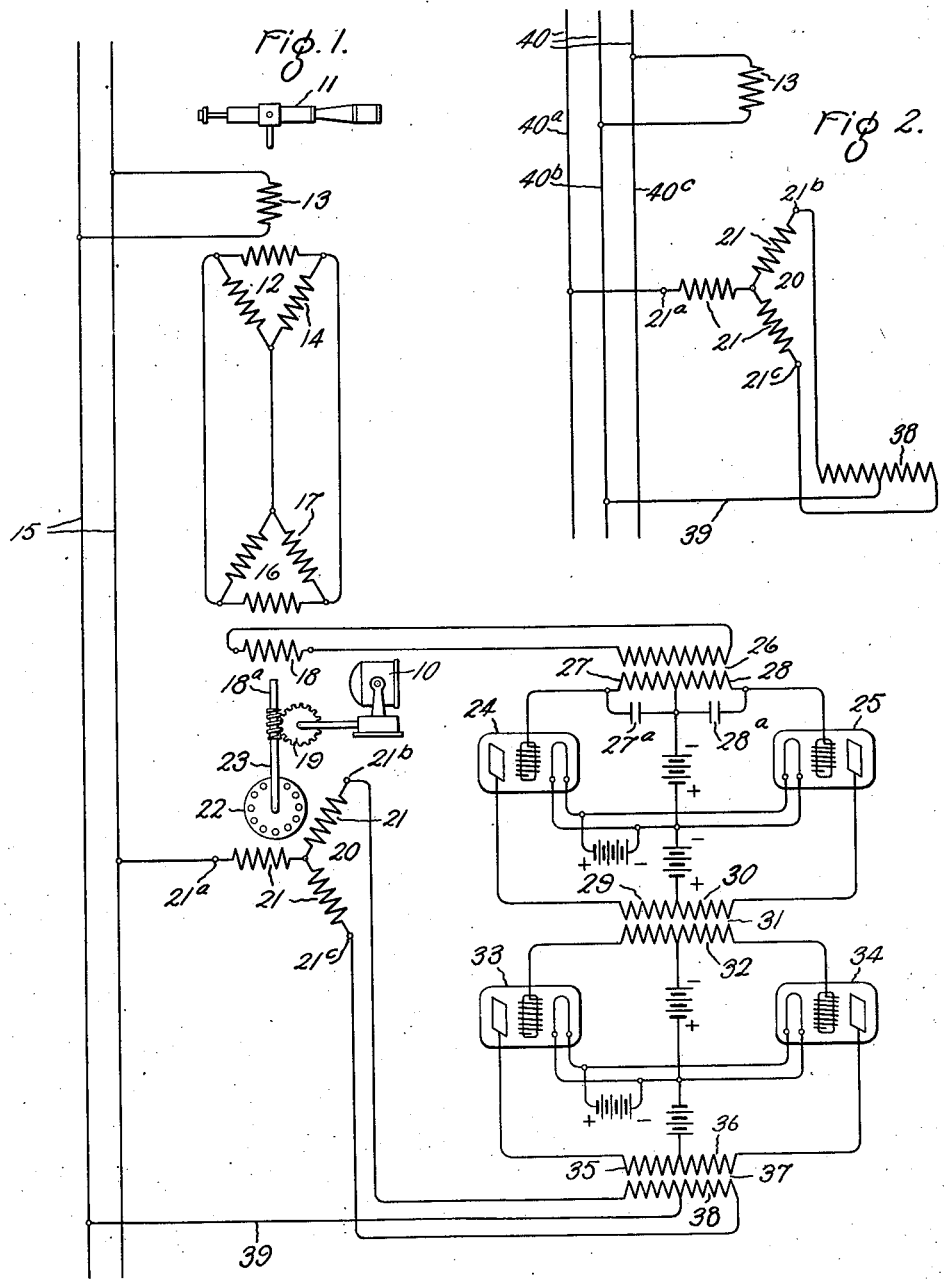
Inventor:
Albert H. Mittag,
by *(signature)*
His Attorney.

Patented July 28, 1925.

1,547,435

UNITED STATES PATENT OFFICE.

ALBERT H. MITTAG, OF SCHENECTADY, NEW YORK, ASSIGNOR TO GENERAL ELECTRIC COMPANY, A CORPORATION OF NEW YORK.

MEANS FOR REPRODUCING POSITION.

Application filed July 20, 1923. Serial No. 652,869.

*To all whom it may concern:*

Be it known that I, ALBERT H. MITTAG, a citizen of the United States, residing at Schenectady, in the county of Schenectady, State of New York, have invented certain new and useful Improvements in Means for Reproducing Position, of which the following is a specification.

My invention relates to means for reproducing position and has for its object the provision of means comprising power amplifying devices for controlling a remote driving motor of the alternating current type.

More specifically my invention relates to systems for reproducing position in which the motion of a controlling object is utilized through suitable mechanism to control a remote servo motor so as to cause the servo motor to drive a second or controlled object into positional agreement with the first.

In carrying out my invention I control the remote servo motor by means of electron discharge devices, and control the electron discharge devices in turn by means of an electromotive force which is substantially proportional in amount and direction to the positional disagreement between the two objects.

For a more complete understanding of my invention reference should be had to the accompanying drawing in which Fig. 1 is a view showing in diagrammatic form means for reproducing position embodying my invention while Fig. 2 is a fragmentary diagramatic view showing a modification of my invention.

Referring to the drawing, I have shown my invention in one form as applied to the automatic controlling of the position of a remote searchlight 10 so as to maintain the searchlight in a predetermined angular relation with a controlling object which is shown as a telescope 11. It is desired, for example, to automatically move the searchlight so that it is always directed on the object at which the telescope is pointing. Operatively connected to the telescope 11 is an inductive device 12 comprising in the form shown a field winding 13 rotatably mounted and driven by movement of the telescope in a horizontal plane or azimuth, and a stationary polycircuit armature winding 14, shown as a three-phase distributed winding. The field winding 13 is energized from a suitable source of alternating current 15. Operatively connected to the searchlight 10 in such manner as to be responsive to its movement in azimuth is a second inductive device 16 similar in construction to the device 12. This second inductive device comprises a three-phase armature winding 17 and a winding 18 which is rotatably mounted and has its shaft 18ᵃ operatively connected through suitable gearing 19 to the searchlight 10 so as to be moved in response to movement of the searchlight in azimuth. The field windings 13 and 18 are preferably connected to be rotated in 1:1 ratios with the telescope and searchlight respectively.

The inductive devices 12 and 16 are of the type often used for transmitting angular motion. In the present application, however, the inductive devices are used for producing an alternating electromotive force which has a value substantially proportional to the angular disagreement in azimuth between the telescope and searchlight and which has a direction with respect to the alternating current supply source 15 determined by the direction of this disagreement. The devices are connected to the telescope and searchlight in such manner that when the searchlight is in angular agreement with the telescope, as shown in the drawing, the winding 18 is in a position with relation to armature winding 17 which is at right angles to the position of the field winding 13 with relation to armature winding 14. In this position of winding 18, it is at right angles to the field generated by armature winding 17 due to energy supplied to it from inductive device 12. It will be observed that field winding 13 induces a set of voltages in the various circuits of its cooperating armature winding 14, which set of voltages are impressed on armature winding 17 whereby a field is set up by winding 17 having a direction corresponding to the direction of the field set up by field winding 13 and hence at right angles to winding 18 when in the position shown so that no voltages are induced therein. In case of angular disagreement of winding 18 with respect to winding 13, it will be observed that a voltage will be induced in winding 18 which voltage will be proportional in amount to the amount of angular disagreement and will have a direction with respect to alternating current supply source 15 determined by the direction of the angular disagreement.

The searchlight is driven in a horizontal plane or azimuth by an electric driving motor 20 of an alternating current type which motor is controlled in response to the voltage induced in winding 18 so as to maintain the searchlight in angular agreement with the telescope. The motor 20 may be and is shown as a three-phase induction motor having a Y connected three-phase winding 21 and a rotor winding 22 shown as a squirrel cage winding. Obviously quarter phase or other types of alternating current motors may be used. The rotor winding should have sufficient resistance that it will not run as a single phase induction motor. As shown, the driving shaft 23 of the motor 20 is a continuation of the shaft 18ª of the inductive device 16 and is connected through gearing 19 to the searchlight.

For the control of the motor 20 the electromotive force induced in winding 18 upon angular disagreement of the telescope and searchlight is impressed on the input or grid circuits of two electron discharge amplifying devices or tubes 24 and 25 shown as of the three-electrode type. This connection is preferably effected through a transformer 26 the secondary of which is provided with a central tap so that one half of the secondary 27 is connected in the input or grid circuit of tube 24 while the other half 28 is connected in the input circuit of tube 25.

For the purpose of improving the operation, condensers 27ª and 28ª are connected across the sections of the secondary although they are not absolutely necessary. The output or plate circuits of the tubes are connected to the two halves 29 and 30 of the primary of transformer 31. The two tubes 24 and 25 are thus connected in a push and pull or two wave circuit so as to reproduce both halves of the electromotive force wave induced in winding 18 and thus impress an alternating voltage on transformer 31. The purpose of tubes 24 and 25 is to amplify the power output of the winding 18.

For the purpose of further amplification the secondary 32 of transformer 31 is provided with a central tap and its two halves are connected in the input or grid circuits of two electron tubes 33 and 34, the output or plate circuits of which are connected to the two halves 35 and 36 of the primary of a transformer 37. The tubes 33 and 34 are connected in push and pull or two wave circuits in the same manner as tubes 24 and 25, their function being to amplify the output of the two latter tubes. Obviously, if desired, further stages of amplification may be used. As thus arranged, the winding 18 supplies only the very slight amount of power required to energize the input circuits of the tubes 24 and 25.

The secondary 38 of transformer 37 is provided with a central tap which is connected through a conductor 39 to one side of the alternating current supply source 15, the opposite side of the supply source 15 being connected to one terminal 21ª of motor winding 21. Terminals 21ᵇ and 21ᶜ of the motor winding are connected to the terminals of the secondary 38 respectively.

It will be observed that this connection of transformer 37 is similar to the well known Scott transformer connection for converting two-phase to three-phase power. I have found that the power output from the electron tube amplifying devices has quite a large phase displacement with respect to the source of supply 15. This power output having one direction is impressed on the secondary 38, the terminals of which are connected to the two terminals of the motor while the source of power supply 15 corresponds to the teaser coil of the Scott connection and is connected in a central tap of the secondary 38 to the remaining terminal of the motor. I have found that this system of connections gives an approximately three-phase source of supply for the motor 20.

In the operation of the system, when the winding 18 is at right angles to winding 13 as shown in the drawing, corresponding to a condition of angular agreement between the searchlight and telescope, no voltage is induced in winding 18, and consequently no power is supplied by the electron discharge amplifying devices to motor 20. The motor is therefore at rest. The single phase power supplied under these conditions from source 15 to the motor will have no effect in causing rotation of the motor. Assuming now that the telescope is moved in one direction, then a voltage will be induced in winding 18 which will result in power being supplied from the electron discharge amplifying devices to the motor 20 causing rotation of the motor whereby the searchlight is moved into angular agreement with the telescope, and at the same time winding 18 is moved to a position of correspondence at right angles with winding 13.

Since the voltage induced in winding 18 depends upon the amount of the angular disagreement, then the power supplied to the motor will likewise depend upon the amount of the angular disagreement. When the searchlight comes into angular agreement with the telescope the three-phase power is shut off from the motor and it subsequently stops. In case the telescope is moved in the opposite direction, it will be observed that since the voltage induced in winding 18 is in the opposite direction, that is, displaced 180 degrees in phase, the power supplied to terminals 21ᵇ and 21ᶜ will be reversed in polarity so that the rotation of the motor will be reversed and the searchlight therefore driven in the proper direction to follow the telescope.

If desired a three-phase source of power supply 40 may be used as shown in Fig. 2. In this case the winding 13 is connected across two conductors 40$^b$ and 40$^c$ while the terminal 21$^a$ of the motor is preferably connected to the remaining conductor 40$^a$, the middle point of secondary 38 being connected to one or the other of conductors 40$^b$ or 40$^c$. It will be understood that the remaining connections not shown in Fig. 2 are the same as shown in Fig. 1.

I have found that a low power factor motor is preferable when using the single phase source of supply as shown in Fig. 1, while a high power factor motor is preferable with the three-phase source of supply shown in Fig. 2.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desired to secure by Letters Patent of the United States, is:

1. Means for reproducing position comprising in combination with a controlling object and a driven object, an alternating current driving motor for said driven object, inductive means for producing an electromotive force upon angular disagreement of said objects substantially proportional in value and direction to such angular disagreement, a source of alternating current supply for said inductive means, power amplifying means controlled by said electromotive force for supplying power out of phase with said electromotive force to one phase of said motor, and electrical connections between said supply source and another phase of said motor, whereby the motor is caused to drive the driven object into angular agreement with the controlling object.

2. Means for reproducing position comprising in combination with a controlling object and a driven object, an alternating current driving motor for said driven object, inductive means for producing an electromotive force upon angular disagreement of said objects substantially proportional in value and direction to such angular disagreement, a source of alternating current supply for said inductive means, electron discharge amplifying devices controlled by said electromotive force, and electrical connections between said motor and said supply source and amplifying devices, whereby the motor is caused to drive the driven object into angular agreement with the controlling object.

3. Means for reproducing position comprising in combination with a controlling object and a driven object, an alternating current driving motor for said driven object, inductive means for producing an alternating electromotive force upon angular disagreement of said objects substantially proportional in value and direction to such angular disagreement, a source of alternating current supply for said inductive means, two electron discharge amplifying devices oppositely connected to be controlled by said alternating electromotive force so that one of said devices repeats certain parts and the other the remaining parts of said electromotive force wave, and electrical connections between said motor and said supply source and amplifying devices, whereby the motor is caused to drive the driven object into angular agreement with the controlling object.

4. Means for reproducing position comprising in combination with a controlling object and a driven object, a polyphase alternating current driving motor for said driven object, inductive means for producing an electromotive force upon angular disagreement of said objects substantially proportioned in value and direction to such angular disagreement, a source of alternating current supply for said inductive means, electron discharge amplifying devices controlled by said electromotive force and connected to supply one phase of said motor, and electrical connections between said supply source and another phase of said motor, whereby the motor is caused to drive the driven object into angular agreement with the controlling object.

5. Means for reproducing position comprising in combination with a controlling object and a driven object, a polyphase alternating current driving motor for said driven object, inductive means for producing an electromotive force upon angular disagreement of said objects substantially proportional in value and direction to such angular disagreement, a source of alternating current supply for said inductive means, electron discharge amplifying devices controlled by said electromotive force, a transformer in the output circuit of said amplifying devices having its secondary connected to one phase of said motor, and electrical connections including a portion of said secondary between said supply source and another phase of said motor, whereby the motor is caused to drive said driven object into angular agreement with the controlling object.

6. Means for reproducing position comprising in combination with a controlling object and a driven object, a polyphase alternating current driving motor for said driven object, inductive means for producing an alternating electromotive force upon angular disagreement of said objects substantially proportional in value and direction to such angular disagreement, a source of alternating current supply for said inductive means, two electron discharge amplifying devices oppositely connected to be controlled by said alternating electromotive force so that one of said devices repeats certain parts and the other the remaining parts of said electromotive force wave, a transformer in the output circuit of said electron discharge devices, and electrical connections between the secondary of said transformer and two terminals of said motor, between an intermediate point of said secondary and said supply source, and between said supply source and another terminal of said motor.

7. Means for reproducing position comprising in combination with a controlling object and a driven object, a polyphase alternating current driving motor for said driven object, an inductive device driven by said controlling object having a polycircuit armature winding and a cooperating field winding, a source of alternating current supply for said field winding, an inductive device having similar windings operatively connected to said driven object, electrical connections between the armature windings of said devices whereby an electromotive force is induced in the field winding of said second device upon angular disagreement of said objects corresponding in value and direction to the amount and direction of such angular disagreement, electron discharge amplifying devices controlled by said electromotive force and connected to supply one phase of said motor, and electrical connections between said supply source and another phase of said motor, whereby the motor is caused to drive the driven object into angular agreement with the controlling object.

8. Means for reproducing position comprising in combination with a controlling object and a driven object, a three-phase alternating current driving motor for said driven object, an inductive device, driven by said controlling object having a polycircuit armature winding and a cooperating field winding, a three-phase source of alternating current supply across two terminals of which said field winding is connected, an inductive device having similar windings operatively connected to said driven object, electrical connections between the armature windings of said devices whereby an electromotive force is induced in the field winding of said second device upon angular disagreement of said objects corresponding in value and direction to the amount and direction of such angular disagreement, a plurality of electron discharge amplifying devices controlled by said electromotive force, a transformer in the output circuit of said amplifying devices having its secondary connected to two terminals of said motor, an electrical connection between the remaining terminal of said motor and the remaining terminal of said supply source, and an electrical connection between another phase of said supply source and an intermediate point of said secondary, whereby the motor is caused to drive the driven object into angular agreement with the controlling object.

In witness whereof, I have hereunto set my hand this 19th day of July, 1923.

ALBERT H. MITTAG.